US009626831B2

(12) United States Patent
Suda et al.

(10) Patent No.: US 9,626,831 B2
(45) Date of Patent: Apr. 18, 2017

(54) GAMING SYSTEM AND METHODS OF PROVIDING AN AWARD TO A PLAYER

(71) Applicant: Konami Gaming, Inc., Las Vegas, NV (US)

(72) Inventors: Satoshi Suda, Henderson, NV (US); Arthur Lee, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

(21) Appl. No.: 14/730,058

(22) Filed: Jun. 3, 2015

(65) Prior Publication Data

US 2015/0356822 A1 Dec. 10, 2015

(30) Foreign Application Priority Data

Jun. 10, 2014 (AU) ................................ 2014203136

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC .......... *G07F 17/3244* (2013.01); *G07F 17/34* (2013.01)

(58) Field of Classification Search

USPC ...................... 463/20, 22, 25, 26, 27, 39, 42

See application file for complete search history.

(56) References Cited

U.S. PATENT DOCUMENTS

| | | | | |
|---|---|---|---|---|
| 7,056,215 | B1 | 6/2006 | Olive | |
| 2004/0266522 | A1 | 12/2004 | Byng | |
| 2005/0143168 | A1* | 6/2005 | Torango | G07F 17/3258 463/25 |
| 2007/0222150 | A1 | 9/2007 | Wright et al. | |
| 2010/0197385 | A1* | 8/2010 | Aoki | G07F 17/32 463/27 |
| 2011/0092276 | A1* | 4/2011 | Acres | G07F 17/3244 463/27 |
| 2012/0289326 | A1 | 11/2012 | Englman et al. | |
| 2015/0356829 | A1* | 12/2015 | Caputo | G07F 17/3262 463/16 |

OTHER PUBLICATIONS

Patent Examination Report No. 1 (AU 2014203136)—Date of Issue: Jul. 29, 2014.

* cited by examiner

*Primary Examiner* — Adetokunbo O Torimiro

(74) *Attorney, Agent, or Firm* — Howard & Howard Attorneys PLLC

(57) ABSTRACT

A system for providing an award to a player is described herein. The system includes a plurality of gaming devices and a controller coupled to each of the gaming devices. Each gaming device is configured to receive a wager from a player and responsively display a game. The controller is configured to receive a signal indicative of a wager being received by at least one of the gaming devices, determine a range of award numbers as a function of at least one previous wager, randomly select an award number from the range of award numbers, and responsively provide an award to the player being associated with the at least one gaming device as a function of the randomly selected award number.

20 Claims, 10 Drawing Sheets

GAMING SYSTEM AND METHODS OF PROVIDING AN AWARD TO A PLAYER

CROSS REFERENCE TO RELATED APPLICATION

This application claims priority to Australian Patent Application No. 2014203136, filed Jun. 10, 2014, the disclosure of which is hereby incorporated by reference in its entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The subject matter disclosed herein relates generally to gaming systems and more particularly, to a system and method for providing a progressive award to a player using a range of numbers determined as a function of a previous wagers.

BACKGROUND OF THE INVENTION

Known gaming devices include a video display device to display a reel game that includes a plurality of reels with each reel including a plurality of symbols. During game play, the gaming device accepts a wager from a player, the player selects one or more paylines, the gaming device spins the reels, and sequentially stops each reel to display a combination of symbols on the reels. The gaming device then awards the player an award based on the combination of symbols orientated along the selected payline.

At least some known gaming devices include progressive awards that are funded by a portion of each wager received such that the amount of the progressive award increases with each wager. Known gaming machines may include mystery progressive award models that require the gaming machine to randomly select a winning prize number from a range of numbers that includes a minimum and a maximum prize value. The gaming machine then tracks each wager, increments a total wager amount based on each received wager, and awards the progressive prize when the total wager amount equals the winning prize number. In addition, in at least some known systems, a gaming device uses a random number generator to pick a number within the range. The player places a bet. The gaming device then increments the jackpot level and determines if the jackpot level exceeds the random generated number. If the jackpot level does exceed the random generated number then the player is awarded the jackpot and the jackpot resets. If the jackpot level does not exceed the random generated number then the jackpot continues to increase with each wager until it is won.

Overtime, players may become frustrated with known progressive award systems because at least some of the players are not eligible to receive the jackpot and each subsequent players success in obtaining the jackpot is based on the player of the previous players. Moreover, each wager being placed by the player is not associated with a chance of winning the progressive award. In addition, at least some players may only play associated gaming machines when the value of the progressive award nears a maximum value, and the probability of obtaining the progressive award has increased.

Accordingly, new features are necessary to appeal to player interest and enhance excitement in order to entice longer play and increased profitability. The present invention is directed to satisfying these needs.

SUMMARY OF THE INVENTION

In one aspect of the present invention, a system for providing an award to a player is provided. The system includes a plurality of gaming devices and a controller coupled to each of the gaming devices. Each gaming device is configured to receive a wager from a player and responsively display a game. The controller is configured to receive a signal indicative of a wager being received by at least one of the gaming devices, determine a range of award numbers as a function of at least one previous wager, randomly select an award number from the range of award numbers, and responsively provide an award to the player being associated with the at least one gaming device as a function of the randomly selected award number.

In another aspect of the present invention, a gaming device for providing an award to a player is provided. The gaming device includes a display device for displaying a game to a player and a controller that is coupled to the display device. The game includes a plurality of reels being displayed in a grid. The controller is configured to receive a signal indicative of a wager being received from a player, determine a range of award numbers as a function of at least one previous wager, randomly select an award number from the range of award numbers, and responsively provide an award to the player as a function of the randomly selected award number.

In yet another aspect of the present invention, a method of providing an award to a player via a system is provided. The system includes a controller that is coupled to a plurality of gaming devices. The method includes the steps of receiving a signal indicative of a wager being received by at least one of the plurality of gaming devices, determining a range of award numbers as a function of at least one previous wager, randomly selecting an award number from the range of award numbers, and responsively providing an award to a player being associated with the at least one gaming device as a function of the randomly selected award number.

BRIEF DESCRIPTION OF THE DRAWINGS

Other advantages of the present invention will be readily appreciated as the same becomes better understood by reference to the following detailed description when considered in connection with the accompanying drawings wherein.

Figure 2:
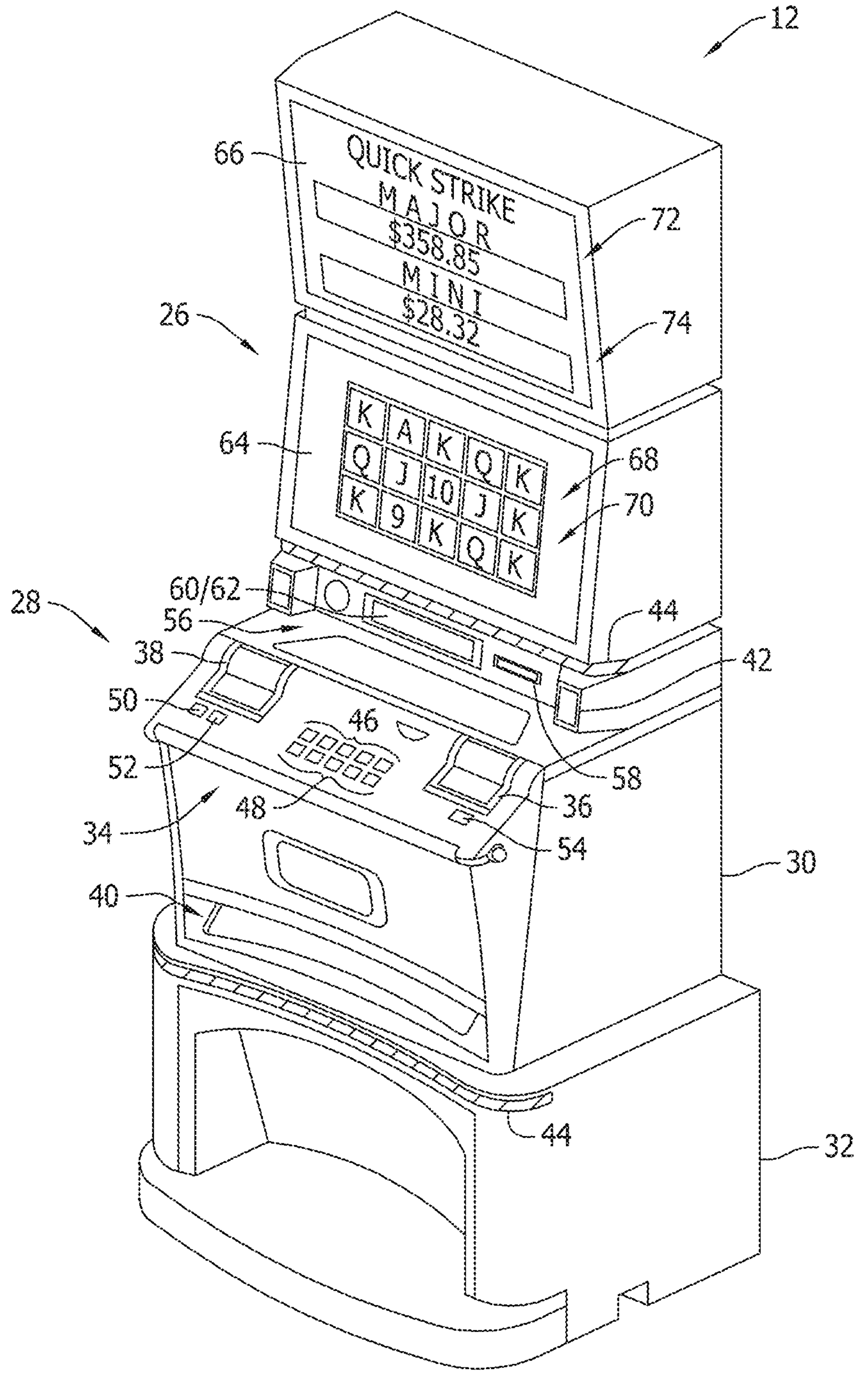
FIG. 2 is a perspective view of an exemplary gaming device that may be used with the system shown in FIG. 1, according to an embodiment of the present invention.
Figure 5:
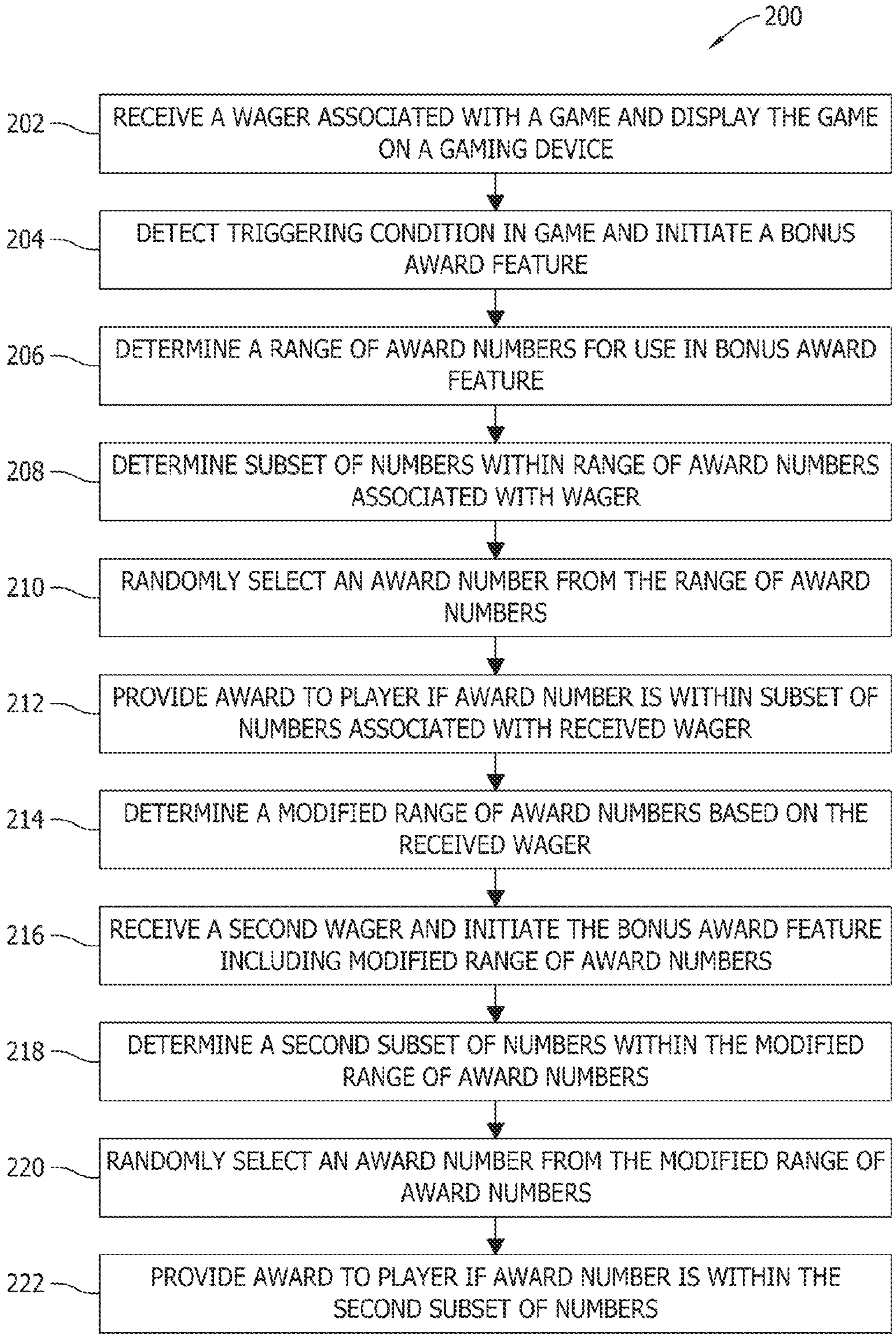
FIG. 5 is a flowchart of a method that may be used with the system and the gaming device shown in FIGS. 1 and 2 for providing an award to a player, according to an embodiment of the present invention.
Figure 6:
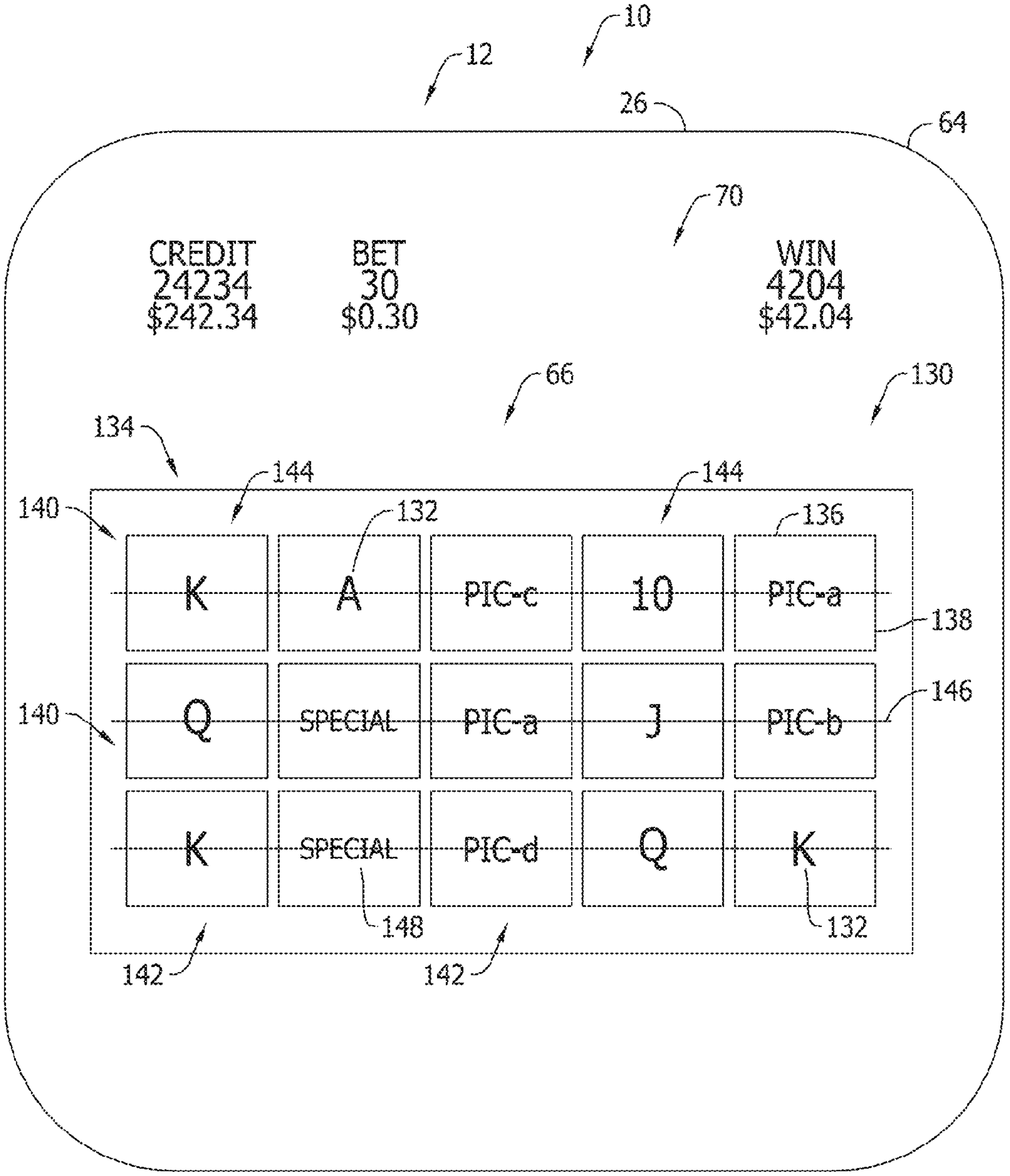
Figure 7:
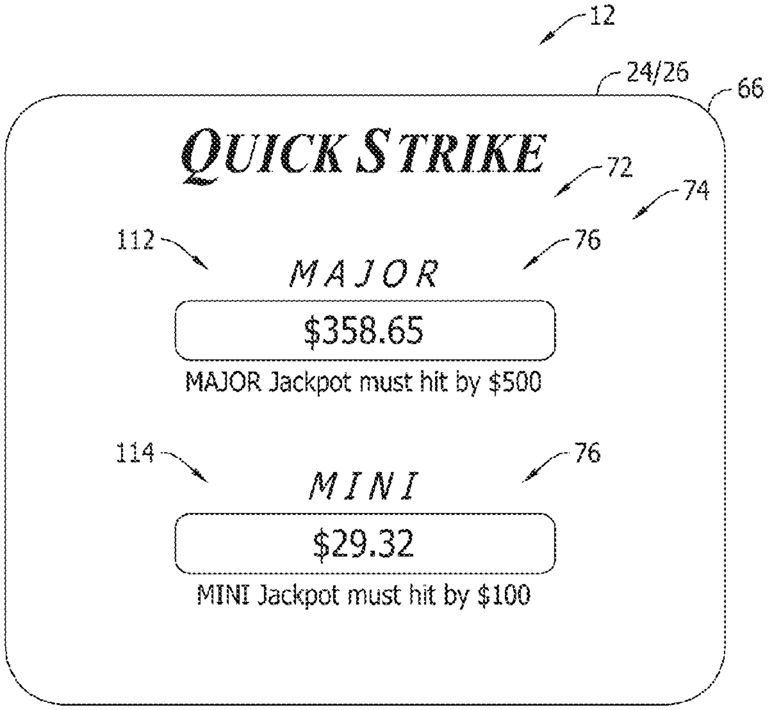
Figure 8:
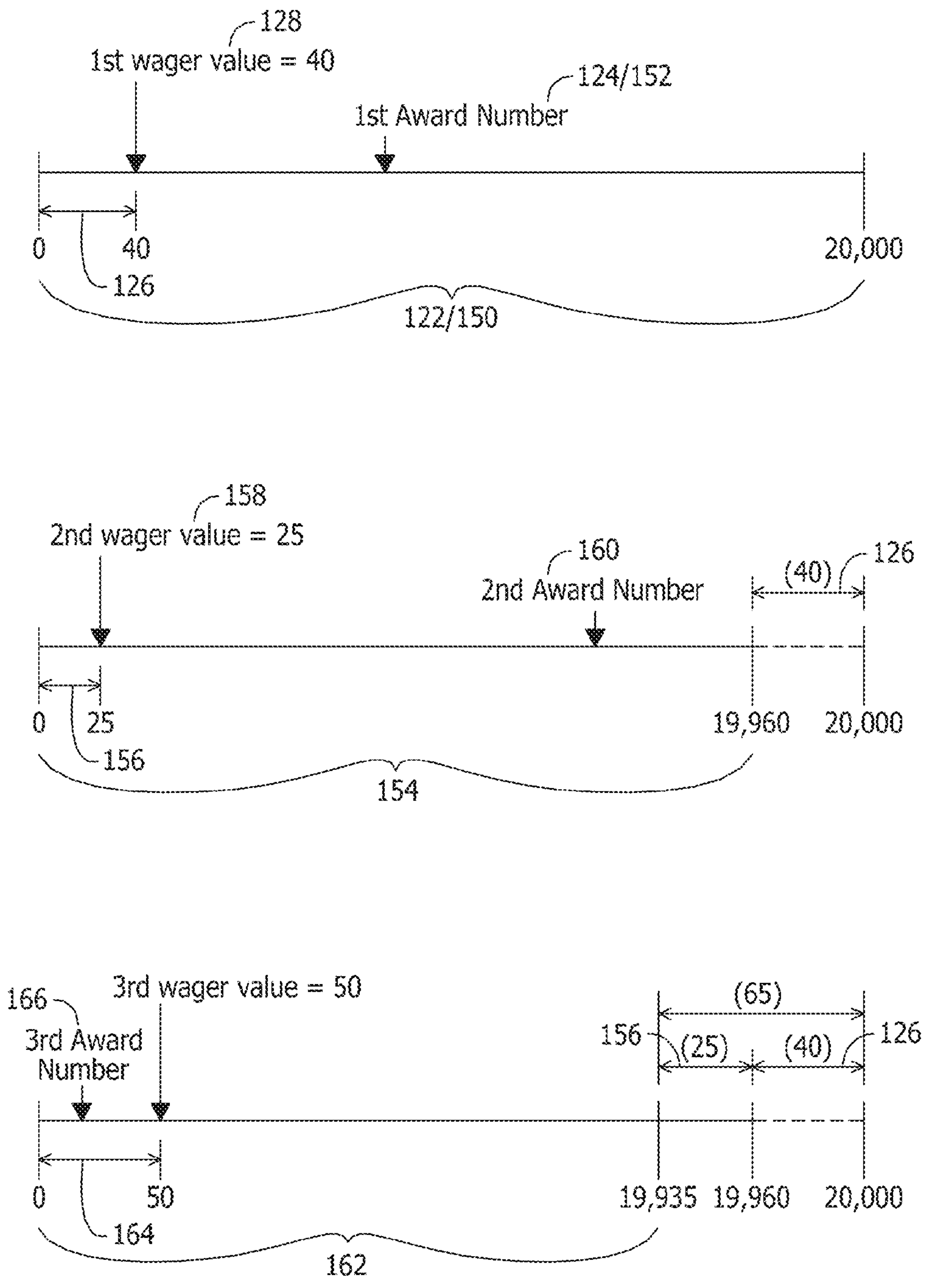
Figure 9:
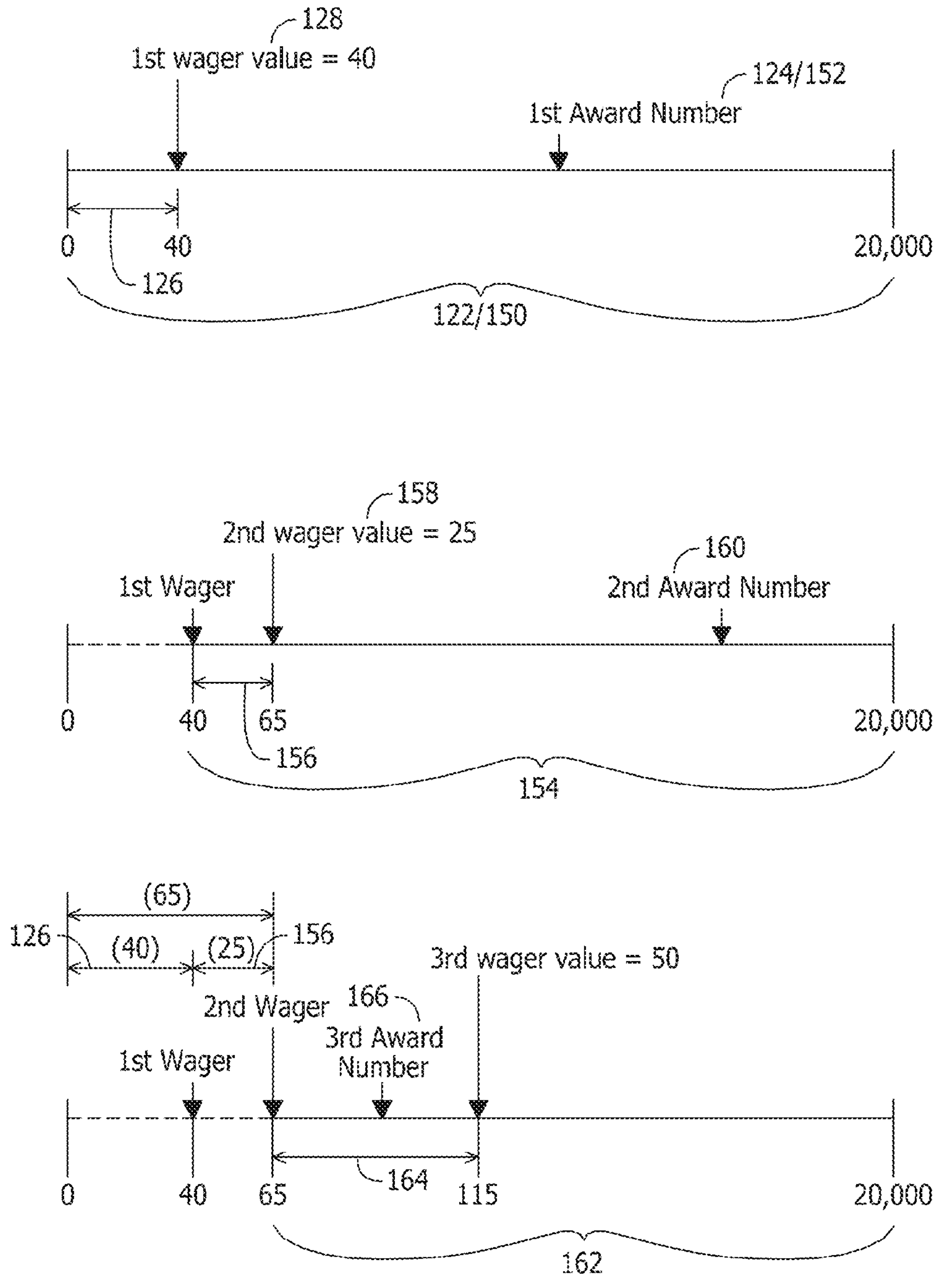
Figure 10:
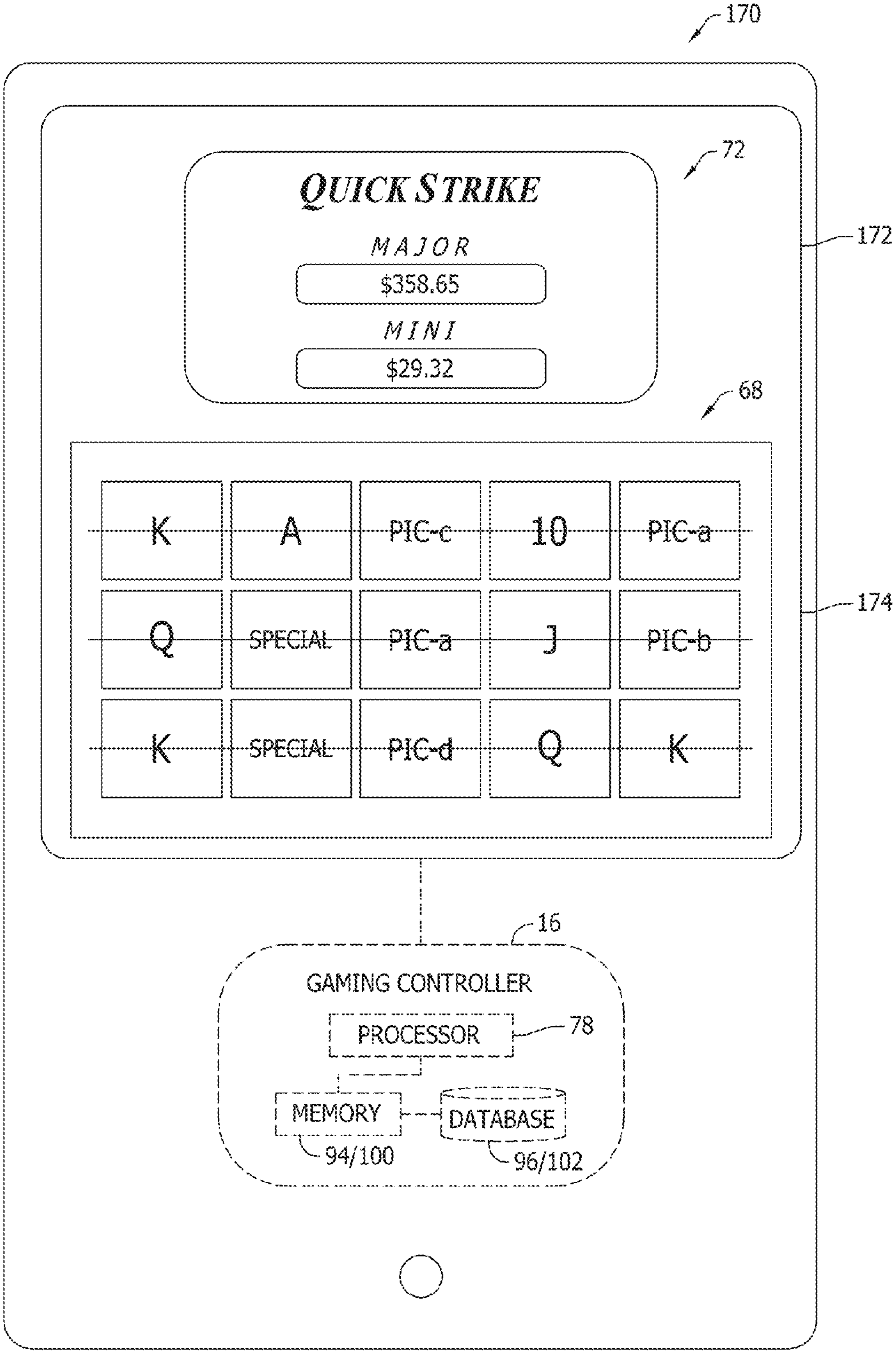

FIG. 6 is an exemplary entertaining graphical display of a slot game that may be displayed on the gaming device shown in FIG. 2, according to an embodiment of the present invention;

FIG. 7 is exemplary entertaining graphical display of an award screen that may be displayed in the gaming device shown in FIG. 2, according to an embodiment of the present invention;

FIGS. 8 and 9 are schematic illustration of the method steps shown in FIG. 5, according to an embodiment of the present invention; and FIG. 10 is a schematic view of another gaming device that may be used with the method shown in FIG. 5, according to an embodiment of the present invention.

Corresponding reference characters indicate corresponding parts throughout the drawings.

DETAILED DESCRIPTION OF THE PREFERRED EMBODIMENT

With reference to the drawings and in operation, the present invention overcomes at least some of the disadvantages of known gaming systems by providing a gaming system that provides a bonus award feature that increases a probability of winning an award based on an amount of previous wagers received. Moreover, the gaming system determines the probability of winning the award as a function of a value of a received wager and a total value of previously received wagers. In addition, the gaming system determines the total value of previously received wagers, determines a range of award numbers as a function of the previous wagers, and randomly selects an award number from the determined range of award numbers. Moreover, the gaming system may reduce the numbers within the range of award numbers based on each previously received wager. In addition, the gaming system selects a subset of numbers from the range of award numbers based on the received wager, and provides the award to the corresponding player if the randomly selected award number is within the subset of numbers associated with the received wager. By selecting a subset of the range of award numbers based on the received wager, each wager being placed by the player is associated with a probability of receiving the award. In addition, by reducing the range of award numbers based on each previous wager, the probability of receiving the award increases with each wager being received. Thus, the amount of time that the gaming devices are played by patrons of a gaming establishment is thereby increased.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
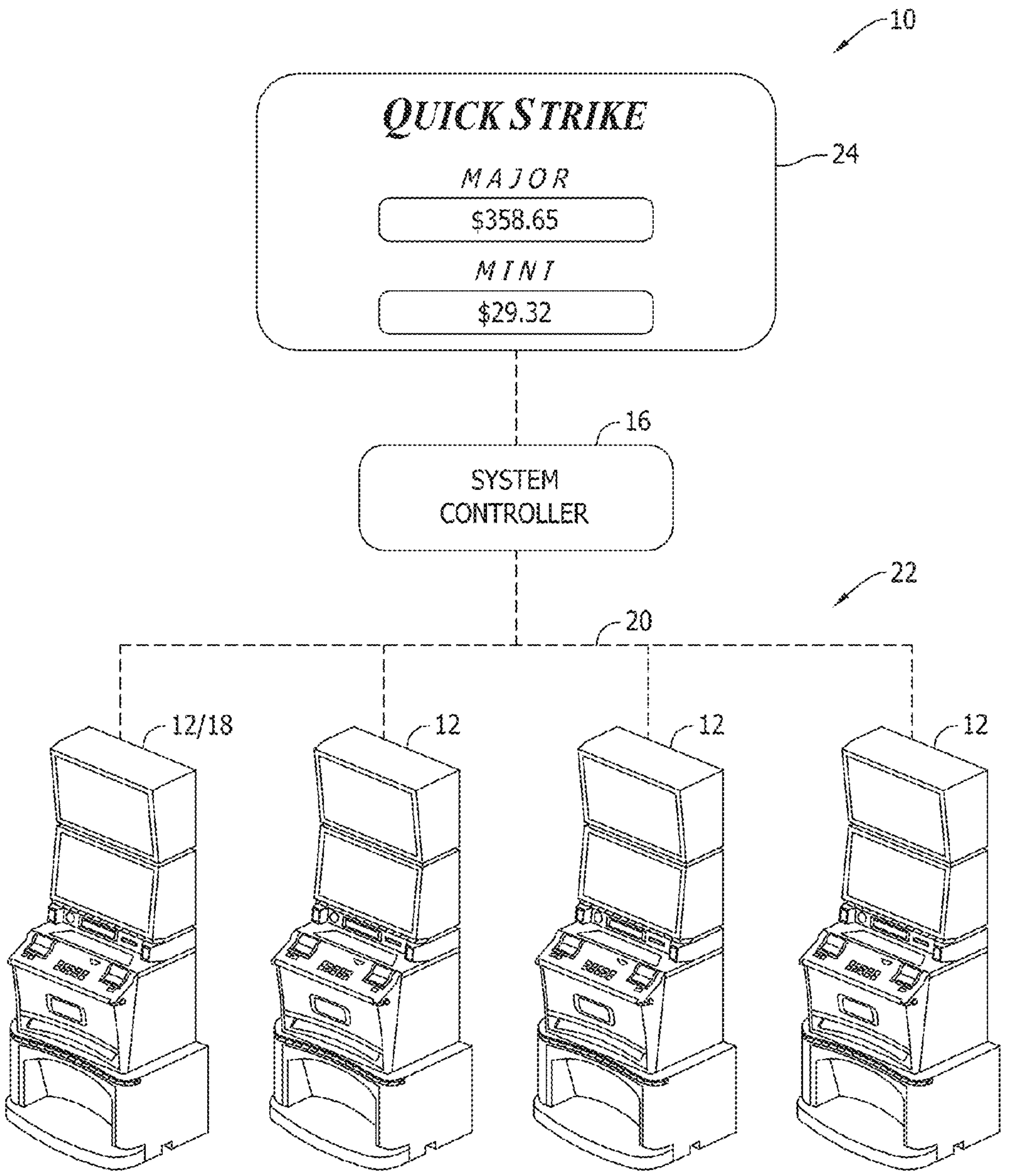
FIG. 1 is a perspective view of an exemplary system, according to an embodiment of the present invention.
Figure 3:
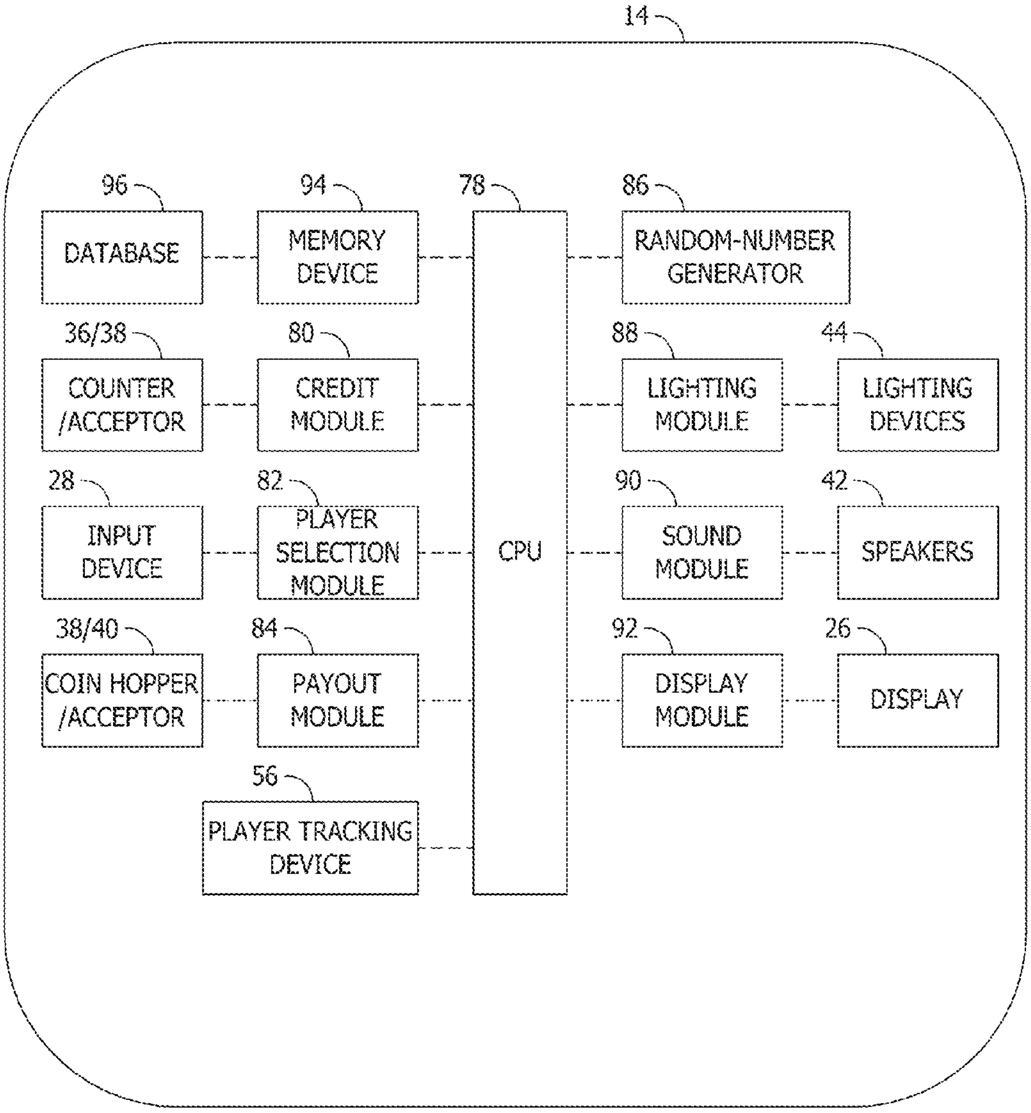
FIG. 3 is a schematic representation of a gaming controller that may be used with the system shown in FIG. 1, according to an embodiment of the present invention.
Figure 4:
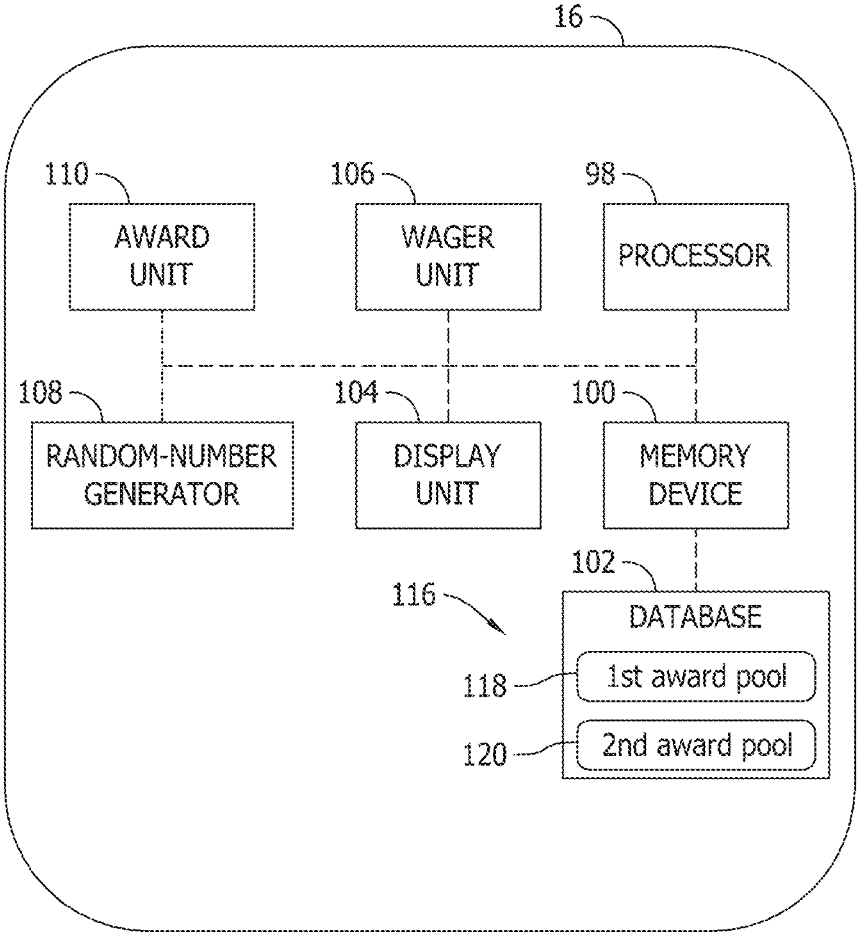
FIG. 4 is schematic representations of a system controller that may be used with the system shown in FIG. 1, according to an embodiment of the present invention.

FIG. 1 is a schematic view of an exemplary gaming system 10 for providing an award to a player, according to an embodiment of the present invention. FIG. 2 is a perspective view of an exemplary gaming device 12 that may be used with the gaming system 10. FIGS. 3 and 4 are schematic representations of a gaming controller 14 and a system controller 16 that may be used with the gaming system 10. In the illustrated embodiment, the gaming system 10 includes one or more gaming devices 12 that are coupled to the system controller 16. In one embodiment, the gaming device 12 may include a gaming machine 18 installed in a casino. In another embodiment, the gaming device 12 may include a personal computer, laptop, cell phone, smartphone, tablet computer, personal data assistant, and/or any suitable computing device that enables a player to connect to the system controller 16.

In the illustrated embodiment, the gaming devices 12 and the system controller 16 are coupled in communication with a local area network (LAN) 20. Alternatively, the gaming devices 12 and the system controller 16 may be coupled via a network such as, for example, an Internet link, an intranet, a wide area network (WAN), dial-in-connections, cable modems, wireless modems, and/or Integrated Services Digital Network (ISDN) lines. In the illustrated embodiment, the gaming system 10 includes four gaming devices 12, which in one embodiment as shown in FIG. 1 are arranged in a bank 22, i.e., are arranged together, adjacently. It should be noted, however, that the gaming system 10 may include any number of gaming devices 12 that may be arranged in any manner, positioned within separate areas of a casino floor, and/or separate gaming establishments such as different casinos. Furthermore, additional groups of gaming devices 12 may be coupled to the system controller 16.

In the illustrated embodiment, the gaming system 10 may also include a central display 24 that is coupled to the system controller 16 for displaying games being played on one or more of the gaming devices 12 and/or bonus award features that are initiated during play of the gaming devices 12.

In the illustrated embodiment, the gaming device 12 includes a display device 26 for displaying a plurality of games, a user input device 28 to enable a player to interface with the gaming device 12, and a gaming controller 14 that is operatively coupled to the display device 26 and the user input device 28 to enable a player to play games being displayed on the display device 26. The gaming device 12 also includes a cabinet assembly 30 that is configured to support the display device 26, the user input device 28, and/or the gaming controller 14 from a gaming stand 32 and/or a supporting surface.

The display device 26 and the user input device 28 are each coupled to the cabinet assembly 30 and are each accessible by the player. In one embodiment, the gaming controller 14 is positioned within the cabinet assembly 30. Alternatively, the gaming controller 14 may be separated from the cabinet assembly 30, and connected to components of the gaming device 12 through a network such as, for example, a LAN, a WAN, dial-in-connections, cable modems, wireless modems, and/or special high-speed ISDN lines. For example, in one embodiment, the gaming controller 14 may be implemented by the system controller 16 and may be located remotely with respect to the gaming devices 12, or within one of the gaming device cabinet assemblies 30. In another embodiment, the system controller 16 may be implemented by one of the gaming controllers 14 associated with a gaming device 12.

In one embodiment, the user input device 28 includes a plurality of input buttons 34, a coin slot 36, and/or a bill acceptor 38. The coin slot 36 includes an opening that is configured to receive coins and/or tokens deposited by the player into the gaming device 12. The gaming controller 14 converts a value of the coins and/or tokens to a corresponding amount of gaming credits that are used by the player to wager on games played on the gaming device 12.

The bill acceptor 38 includes an input and output device that is configured to accept a bill, a ticket, and/or a cash card into the bill acceptor 38 to enable an amount of gaming credits associated with a monetary value of the bills, ticket, and/or cash card to be credited to the gaming device 12. Moreover, the gaming device 12 may also utilize a cashless wagering system (not shown), such as a ticket in ticket out (TITO) system (not shown). In one embodiment, the bill acceptor 38 also includes a printer (not shown) that is configured to dispense a printed voucher ticket that includes information indicative of an amount of credits and/or money paid out to the player by the gaming device 12 during a gaming session. The voucher ticket may be used at other gaming devices, or redeemed for cash, and/or other items as part of a casino cashless system (not shown).

A coin hopper 40 is coupled to the cabinet assembly 30 and is configured to receive a plurality of coins that are dispensed from the gaming device 12. One or more speakers 42 are installed inside the cabinet assembly 30 to generate voice announcements and/or sound effects associated with game play. The gaming device 12 also includes one or more lighting devices 44 that are configured to blink and/or change brightness and color in specific patterns to produce lighting effects to enhance a visual gaming experience for the player.

In one embodiment, the input buttons 34 include a plurality of BET switches 46 for inputting a wager on a game, a plurality of selection switches 48 for selecting a betting line, a payline, and/or card, a MAXBET switch 50 for inputting a maximum wager, a PAYOUT switch 52 for ending a gaming session and dispensing accumulated gaming credits to the player, and a start switch, i.e., a SPIN/DEAL button 54 to initiate an output of a game.

In the illustrated embodiment, the BET switches 46 include five switches from 1BET to 5BET to enable a player to wager between a minimum bet up to 5× minimum bet. Each selection switch 48 corresponds to a betting line such as, for example, a payline and/or symbol for a reel game, one or more cards for a card game, and/or a symbol for a roulette game, to enable a player to associate a wager with one or more betting lines. The MAXBET switch 50 enables a player to input the maximum bet that a player can spend against one play of a game. The PAYOUT switch 52 enables a player to receive the amount of money and/or credits awarded to the player during a gaming session, which has been credited onto the gaming device 12.

The gaming device 12 also includes a player tracking device 56 that is coupled to the gaming controller 14 for identifying the player and/or a player tracking account that is associated with the player. The player tracking account may include, but is not limited to, gaming credits available to the player for use in playing the gaming device 12. The player tracking device 56 is configured to communicate player account information between a player tracking controller (not shown) and the gaming device 12. For example, the player tracking device 56 may be used to track bonus points and/or credits awarded to the player during a gaming session and/or track bonus and/or credits downloaded to the gaming device 12 from the player tracking system. In the illustrated embodiment, the player tracking controller assigns a player status, e.g. a player ranking, based on the player account information. For example, the player tracking information may include, but is not limited to, a frequency in which the player plays a game, the average wager the player makes per play of a game, a total amount wagered by the player over a predefined period of time, and/or any other suitable player tracking information.

The player tracking device 56 is coupled to the gaming cabinet assembly 30 and includes a player identification card reader 58, a data display 60, and a keypad 62. The player identification card reader 58 is configured to accept a player tracking card (not shown) inserted by the player, and read information contained on the player tracking card to identify the player account information. The player identification card reader 58 may include, but is not limited to, a barcode reader, a magnetic card reader, and/or a radio frequency identification (RFID) card reader. The keypad 62 is configured to accept a user selection input such as, for example, a unique player personal identification number (PIN) to facilitate enabling the gaming device 12 to identify the player, and access player account information associated with the identified player to be displayed on the data display 60. In one embodiment, the data display 60 includes a touchscreen panel that includes the keypad 62. Alternatively, the data display 60 and the keypad 62 may be included in the display device 26.

In one embodiment, the display device 26 includes a first display 64 and a second display 66. The first display 64 is configured to display a game 68 on a game screen 70 (shown in FIG. 6) including indicia and/or symbols for use in the game 68, e.g., cards used by a card game, roulette wheel and symbols used in a roulette game, and reels used in a reel game. The game 68 may include any type of game including, but not limited to, a video slot game, a keno game, a blackjack game, a video poker game, or any type of game which allows a player to make a wager, play a game, and potentially provide the player an award based on an outcome of the game and a paytable. The second display 66 is configured to display a bonus award feature 72 on a bonus award feature screen 74 (shown in FIG. 7) that displays one or more bonus awards 76 that may be provided to the player. Moreover, each display 64 and 66 may be configured to display at least a portion of the game screen 70 and/or bonus award feature screen 74. In one embodiment, the central display 24, the first display 64, and/or the second display 66 may include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touch screen, may function as both the display device 26 and as the user input device 28. In an alternative embodiment, the first display 64 and/or the second display 66 may include a plurality of mechanical reels displaying a plurality of game symbols.

Referring to FIG. 2, in one embodiment, the gaming controller 14 may include a processor, i.e., a central processing unit (CPU) 78, a credit module 80, a player selection module 82, a payout module 84, a random-number generator (RNG) 86, a lighting module 88, a sound module 90, a display module 92, a memory device 94, and a database 96. The memory device 94 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 78 to store, retrieve, and/or execute instructions and/or data.

The CPU 78 executes various programs, and thereby controls other components of the gaming controller 14 according to player instructions and data accepted by the user input device 28. The CPU 78 in particular executes a game program, and thereby conducts a game in accordance with the embodiments described herein. The memory device 94 stores programs and databases used by the CPU 78.

Moreover, the memory device 94 stores and retrieves information in the database 96 including, but not limited to, wagers, wager amounts, average wagers per game, a game type, awards, type of awards, a number of reels associated with a game, a number of symbols being displayed on each reel, image data for producing game images and/or screens on the display device 26, and temporarily stores variables, parameters, and the like that are used by the CPU 78. In addition, the memory device 94 stores indicia, symbol weights, symbol values, paytables, and/or winning combination tables which represent relationships between combinations of random numbers and types of awards. In one embodiment, the memory device 94 utilizes RAM to temporarily store programs and data necessary for the progress of the game, and EPROM to store, in advance, programs and data for controlling basic operation of the gaming device 12, such as the booting operation thereof.

The credit module 80 manages the amount of player's credits, which is equivalent to the amount of coins and bills counted and validated by the bill acceptor 38. The player selection module 82 monitors player selections received through the input buttons 34, and accepts various instructions and data that a player enters through the input buttons 34. The payout module 84 converts a player's credits to coins, bills, or other monetary data by using the coin hopper 40 and/or for use in dispensing a credit voucher via the bill acceptor 38.

The lighting module 88 controls one or more lighting devices 44 to blink and/or change brightness and color in specific patterns in order to produce lighting effects associated with game play. The sound module 90 controls the speakers 42 to output voice announcements and sound effects during game play.

The display module 92 controls the display device 26 to display various images on a graphical interface including the game screen 70 and/or the bonus award feature screen 74 preferably by using computer graphics and image data stored in the memory device 94. More specifically, the display module 92 controls video reels in the game screen 70 displayed on the first display 64 and/or the second display 66 by using computer graphics and the image data. In another embodiment, the display device 26 includes a plurality of mechanical reels. The display module 92 is configured to control a rotation of each of the plurality of mechanical reels to spin and stop each reel to display a game outcome.

The RNG 86 generates and outputs random numbers to the CPU 78 preferably at the start of each round of a game. The CPU 78 uses the random numbers to determine an outcome of the games. For example, if the game is a video slot game, the CPU 78 uses the RNG 86 to randomly select an arrangement of symbols to be displayed on video reels. Moreover, the CPU 78 generally uses random numbers generated by the RNG 86 to play the games and to determine whether or not to provide an award to a player. In one embodiment, the CPU 78 may also use the random numbers to determine a stop position of each reel for use in stopping each of a plurality of mechanical reels being displayed in the display device 26 to display the game outcome. The CPU 78 may also receive combinations of random numbers from the RNG 86 and compare the generated combinations with winning combinations stored in the winning combination table to determine if the generated outcome is a winning outcome that is associated with a type of award. In general, the term "award" may be a payout, in terms of credits or money. Thus, the CPU 78 may award a regular payout in response to the outcome of the game 68. However, it should be noted that the term award may also refer to other types of awards, including, prizes, e.g., meals, show tickets, etc. . . . , as well as in-game award, such as bonus features, free games, and/or free spins, or awarding the player one or more wild symbols or stacked wild symbols in each of the games.

Referring to FIG. 4, in the illustrated embodiment, the system controller 16 includes a processor 98, a memory device 100, a database 102, a display unit 104, a wager unit 106, a RNG unit 108, and an award unit 110. The system controller 16 is coupled in communication with each gaming device 12 and is configured to determine if a bonus triggering event occurs during play of one or more games on one or more gaming devices 12, responsively initiate a bonus award feature 72, determine an outcome of the bonus award feature 72, and provide an award to player as a function of the bonus award feature outcome. In the illustrated embodiment, the bonus award feature 72 includes one or more bonus awards 76 that may be provided to one or more players. In one embodiment, one or more bonus awards 76 may include a progressive award that is at least partially funded by a portion of each wager being received by each of the gaming devices 12. For example, in one embodiment, as each player places a wager associated with a game being played on one or more gaming devices 12, a portion of each wager is used to fund an award pool being associated with the progressive award. As each wager is received, the amount of the associated progressive award may also increase. In addition, the system controller 16 may be configured to provide the bonus award 76 to a player upon detecting the occurrence of a predefined condition such as, for example, at or before a predefined maximum progressive award value has been funded, a predefined number of wagers being placed, and/or a predefined number of games being played.

During the bonus award feature 72, if the system controller 16 determines that a bonus award 76 is being provided to a player, the system controller 16 provides the bonus award 76 with funds being stored in the corresponding award pool. In the illustrated embodiment, the bonus award feature 72 includes a first award 112, e.g. a Major award and a second award 114, e.g. a Mini award. Each of the Major award 112 and the Mini award 114 may be funded from separate award pools. In another embodiment, each bonus award 76 may be funded from the same award pool. Moreover, the Major award 112 may include an award value that is larger than the award value being associated with the Mini award 114.

The processor 98 executes various programs, and thereby controls other components of the system controller 16 and executes a bonus award feature program, and thereby conducts the bonus award feature 72 in accordance with the embodiments described herein. The memory device 100 stores programs and databases used by the processor 98 and stores and retrieves information in the database 102 including, but not limited to, ranges of award numbers, progressive awards, award types, award values, award pools, image data for producing bonus award feature screens on each gaming device 12 and/or the central display 24, and temporarily stores variables, parameters, and the like that are used by the processor 98. For example, in one embodiment, the database 102 may include a list of award pools 116 including a first award pool 118 and a second award pool 120 that each includes information being associated with the first award 112 and the second award 114, respectively, such as, for example, a current award value and/or a maximum award value.

The display unit 104 is configured to display the bonus award feature screen 74 including the bonus award feature 72 on the central display 24 and/or on the display devices 26 of one or more gaming devices 12 preferably by using computer graphics and image data stored in the memory device 100. In one embodiment, the display unit 104 may simultaneously display the bonus award feature screen 74 on each of the gaming devices 12. In another embodiment, the display unit 104 may display the bonus award feature screen 74 on the central display 24 and/or one or more of the gaming devices 12.

In the illustrate embodiment, the wager unit 106 receives a signal indicative of a wager being received by one or more gaming devices 12 and transmits information indicative of the received wager to the award unit 110. In addition, the wager unit 106 may also store information associated with each received wager in the database 102. Moreover, the wager unit 106 may determine a total amount of wagers being received since a bonus award 76 has been provided to a player, and store the total amount of wagers in the database 102. For example, in one embodiment, the wager unit 106 may track the amount of wagers being received since a previous bonus award 76 has been provided to a player, and update the total amount of wager with each received wager. In one embodiment, the wager unit 106 may receive the wager information from a credit module 80 and/or a player selection module 82 being associated with a corresponding gaming device 12.

The RNG unit 108 generates and outputs random numbers to the award unit 110 for use in the bonus award feature 72. In the illustrated embodiment, the award unit 110 receives a random number from the RNG unit 108 upon receiving a wager from a gaming device 12 and determines whether to provide a bonus award to the player that is associated with the corresponding gaming device 12 as a function of the randomly selected number. Moreover, the award unit 110 may select a random number for each wager being received such that, for each wager being received, the award unit 110 selects another random number. In one embodiment, the award unit 110 retrieves a separate random number for each of the bonus awards 76 being included in the bonus award feature 72 and determines whether to provide a corresponding bonus award 76 based on the associated random number. For example, if the bonus award feature 72 includes the first award 112 and the second award 114, upon receiving a wager from a player, the award unit 110 may retrieve a first random number being associated with the first award 112 and retrieve a second random number being associated with the second award 114. In another embodiment, the award unit 110 may use one random number in determining whether to provide each of the bonus awards 76.

In the illustrated embodiment, the award unit 110 determines a range of award numbers 122 (shown in FIG. 8) being associated with each bonus award 76, randomly selects an award number 124 from the range of award numbers 122, and determines whether to provide a corresponding bonus award 76 as a function of the randomly selected award number 124. Moreover, the award unit 110 may determine a subset of numbers 126 within the range of award numbers 122 as a function of the received wager, and responsively provide the bonus award 76 to the player if the selected award number 124 is within the determined subset of numbers 126. In addition, the award unit 110 may determine a wager number 128 within the range of award numbers 122 as a function of the received wager and provide the bonus award 76 to the player as a function of the determined wager number 128. For example, in one embodiment, the award unit 110 may provide the bonus award 76 to the player if the selected award number 124 matches the wager number 128. In another embodiment, the award unit 110 may provide the bonus award 76 to the player if the selected award number 124 is less than the wager number 128.

In one embodiment, the range of award numbers 122 may include a predefined range of numbers being associated with the corresponding bonus award 76. In another embodiment, the award unit 110 may determine the range of award numbers 122 as a function of an amount and/or value of at least one previously received wager. For example, in one embodiment, the award unit 110 may receive the total amount of previous wagers being received since a previously award of the bonus award 76 from the wager unit 106 and determine the range of award numbers 122 as a function of the total value of previous wagers. The award unit 110 may retrieve a predefine range of award numbers being associated with the bonus award 76 from the database 102 and determine the range of award numbers 122 as a function of the predefined range of numbers and the total value of previous wagers. For example, in one embodiment, the award unit 110 may subtract the total value of previous wagers from the predefine range of numbers to generate the range of award numbers 122 being associated with the bonus award 76.

FIG. 5 is a flowchart of a method 200 that may be used with the system 10 to provide an award to a player. The method 200 includes a plurality of steps. Each method step may be performed independently of, or in combination with, other method steps. Portions of the method 200 may be performed by any one of, or any combination of, the components of the system 10 and/or one or more gaming devices 12. FIG. 6 is an exemplary entertaining graphical display of the slot game 68 that may be played with a gaming device 12. FIG. 7 is exemplary entertaining graphical display of a bonus award feature screen 74 that may be displayed on one or more gaming devices 12 and/or the central display 24. FIGS. 8 and 9 are schematic illustration of the method 200.

In the illustrated embodiment, in method step 202, the system controller 16 receives a signal indicative of a wager being received by at least one of the gaming devices 12. In addition, the gaming controller 14 being associated with the corresponding gaming device 12 allows a player to make a wager associated with a game 68 and responsively displays the game 68 on the corresponding gaming machine display device 26. In one embodiment, the game 68 is a video slot game. However, it should be noted that the game 68 may be any type of game upon which a player could make a wager including, but not limited to a keno game, a blackjack game, a video poker game, or any type of game that enables the system controller 16 and/or the gaming controller 14 to function as described herein. In addition, in one embodiment, the game 68 may include a slot game being displayed with a plurality of mechanical reels (not shown). In the illustrated embodiment, the gaming controller 14 displays the game 68 on the first display 64. In another embodiment, the gaming controller 14 displays the game 68 on the first display 64 and/or the second display 66.

In method step 202, the gaming controller 14 randomly generates an outcome 130 of the game 68 and displays the generated game outcome 130 in the game screen 70. The gaming controller 14 randomly selects a plurality of game symbols 132 from a predefined set of possible game symbols and displays the selected game symbols 132 associated with the generated game outcome 130 in the game screen 70. In the illustrated embodiment, the plurality of symbols 132 are displayed in a display area 134 that includes a grid 136 having a plurality of cells 138 arranged along a plurality of rows 140 and a plurality of columns 142. Each cell 138 displays one or more game symbols 132 associated with the game outcome 130. In the illustrated embodiment, the gaming controller 14 displays the game symbols 132 within a plurality of reels 144. Each reel 144 is associated with a corresponding column 142. The game 68, in the illustrated embodiment, includes 5 reels 144 with 3 cells per reel, respectively (a "5×3" arrangement) displayed in the display area 134. Alternatively, other reel arrangements may be used such as, for example, 3-4-3-4-3, 4-5-5-5-4, or 4-5-4-5-4 arrangements or arrangements with the same number of cells per column, such as 3×3, 3×4, 4×5, or 5×5 configurations. The game 68 may also include a plurality of paylines 146 that extend across one or more cells 138 to indicate, to the player, a combination of game symbols 132.

Each game 68 is generally played in a conventional manner. The player makes a wager, which may be based on a predetermined denomination and a selected number of paylines 146, the gaming controller 14 randomly generates an outcome for the game 68, spins the reels 144, and selectively stops the reels 144 to display a game symbol 132 in each of the display cells 138. If a predetermined pattern of symbols 132 is randomly chosen for each cell 138 on a played payline 146, the player may be awarded a payout based on the payline, the wager, and a predetermined paytable. Moreover, the player may be awarded a payout if the combination of symbols 132 associated with a selected payline 146 is a winning combination. In addition, a player may receive a bonus feature, bonus games, and/or free games based on the combination of symbols 132 associated with the selected payline 146 and/or the appearance of one or more special symbols 148 in the game outcome 130. Many variations to the above described general play of a slot game fall within the scope of the present invention. Such slot games are well-known in the art, and are therefore not further discussed.

In the illustrated embodiment, the gaming controller 14 receives a signal, from the user input device 28, that is indicative of a player's selection to initiate a gaming session including a wager amount, and a selection of one or more paylines 146 associated with a predefined set of cells 138 within the display area 134. In the illustrated embodiment, the game 68 is a multi-line game, i.e., the paylines include horizontal paylines and/or diagonal pay-lines, and/or zig-zag paylines. Moreover, the user input device 28 may allow the player to toggle to increase the bet per payline a credit at a time (up to the maximum bet). The gaming controller 14 randomly generates an outcome of the game 68, and displays the generated outcome 130 on the game screen 70. In one embodiment, the gaming controller 14 is configured to rotate, and/or spin each reel 144 to initiate a game play, and stop each reel 144 to display a plurality of symbols 132 associated with the randomly generated outcome 130. In addition, the gaming controller 14 is adapted to determine if the generated outcome 130 is a winning outcome as a function of the displayed game symbols 132, a paytable, a wager, and one or more player selected paylines 146. More specifically, the gaming controller 14 determines if a combination of symbols 132 arranged along the selected payline 146 is a winning combination. The gaming controller 14 may provide an award in response to the outcome of the game 68.

In method step 204, the system controller 16 detects the occurrence of a triggering condition during the game 68 and initiates the bonus award feature 72 (shown in FIGS. 7-9) in response to detecting the triggering condition. In the illustrated embodiment, the triggering condition is defined as receiving a wager from a player via a gaming device 12. In one embodiment, the triggering condition may be defined as a winning combination being formed along a selected payline. In another embodiment, the triggering condition may include an appearance of one or more special symbols 148 being displayed in the outcome 130 of the game 68. In another embodiment, the system controller 16 may define the triggering condition as a predefined amount of wagering credits being placed as a wager during the game 68 and/or a predefined number of games being played by the player.

In method step 206, the system controller 16 initiates the bonus award feature 72 and determines a first range of award numbers 150 for use in the bonus award feature 72. In one embodiment, the system controller 16 may randomly select a minimum value and a maximum value of the first range of award numbers 150. In addition, the system controller 16 may select a maximum range value based on the current value of the bonus award 76 and/or the maximum award value of the bonus award 76. Moreover, the system controller 16 may also select the minimum range value based on a minimum award value of the bonus award. In another embodiment, the first range of award numbers 150 may be selected from a list of predefined ranges included in the database 102. Moreover, each predefined range may be indicative of a maximum award amount being associated with the bonus award 76 and/or the maximum amount of total wagers that may be received before the system controller 16 awards the associated bonus award 76. For example, as shown in FIG. 8, in one embodiment, the first range of award numbers 150 may include a range of numbers from 0 to 20,000, with 20,000 being indicative of the amount of coin in, e.g. wagers that may be required to reach a high jackpot award value from a low jackpot award value. In one embodiment, the bonus award feature 72 may include the Major award 112 and the Mini award 114. The system controller 16 may determine a range of award numbers being associated with the Major award 112 and another range of award numbers being associated with the Mini award 114.

In one embodiment, the system controller 16 may determine the first range of award numbers 150 as a function of a value of at least one previous wager received by one or more of the gaming devices 12. Moreover, the system controller 16 may determine the first range of award numbers 150 based on a predefined range and the previous wagers. For example, in one embodiment, the system controller 16 may select a predefined range of numbers including a range between 0 to 20,000. The system controller 16 may determine a corresponding value of a previous wager being equal to 40, and determine the first range of award numbers 150 being equal to the predefined range of numbers less the previous wager amount, e.g. a range of numbers between 0 to 19,960 (20,000 less 40 wager value=19,960). Moreover, the system controller 16 may also determine a total value of wagers having been received since the last bonus award 76 was provided to a player, and determine the first range of award numbers 150 based on the total value of previous wagers. For example, in one embodiment, the first range of award numbers 150 may be determined to be equal to a predefined range less the total value of previous wagers.

In method step 208, the system controller 16 determines a subset of numbers 126 within the first range of award numbers 150 as a function of the received wager. For example, in one embodiment, the system controller 16 may receive a first wager from a gaming device 12, determine a value of the first wager, and determine the subset of numbers 126 as a function of the wager value. In one embodiment, the wager value may be indicative of a number of credits being associated with the wager. In another embodiment, the wager value may be a portion of the number of credits being associated with the wager. For example, in one embodiment, the system controller 16 may receive a first wager equal to 40 credits and determine the subset of numbers 126 to include the range of numbers between 0 and 40 within the first range of award numbers 150. In one embodiment, the subset of numbers 126 may include a consecutive range of numbers. In another embodiment, the subset of numbers 126 may include randomly selected numbers and/or groups of consecutive numbers. For example, in one embodiment, the system controller 16 may determine a value of the received wager and randomly select an amount of numbers equal to the value of the wager. Moreover, in one embodiment, the system controller 16 may determine the value of the first wager being equal to 40 numbers, and randomly select 40 numbers from the first range of award numbers 150 to be included in the subset of numbers 126.

In another embodiment, the system controller 16 may also determine a wager number 128 within the first range of award numbers 150 as a function of the received wager. The wager number 128 may be indicative of the number of credits being associated with the wager, the value being associated with the wager, and/or any suitable number that may be indicative of a value of the received wager. For example, the wager number 128 may be indicative of an amount of gaming credits, coins, bills, award credits, an amount of free games, and/or any suitable value being associated with the received wager. In addition, the system controller 16 may also determine the subset of numbers 126 as a function of the wager number 128.

In method step 210, the system controller 16 randomly selects a first award number 152 from the first range of award numbers 150 and associates the first award number 152 with the bonus award 76. The system controller 16 also responsively provides the bonus award 76 to the associated player as a function of the randomly selected first award number 152. In one embodiment, the system controller 16 may select an award number being associated with the first award, e.g. the Major award 112, and select another award number being associated with the second award, e.g. the Mini award 114.

In method step 212, the system controller 16 determines if the randomly selected first award number 152 is within the subset of numbers 126 and responsively provides the corresponding bonus award 76 to the player if the selected first award number 152 is within the subset of numbers 126. For example, as shown in FIG. 8, in one embodiment, the system controller 16 receives a first wager via a gaming device 12 and determines the first range of award numbers 150 including a range of numbers between 0 and 20,000. The system controller 16 may also determine a wager number 128 being indicative of the value of the first wager and determine the subset of numbers 126 including a corresponding range of numbers, e.g. between 0 and 40. The system controller 16 may also randomly select the first award number 152 from the first range of award numbers 150, determine if the randomly selected first award number 152 is within the subset of numbers 126, e.g. between the range of 0 and 40, and responsively provide the bonus award 76 to the player if the selected first award number 152 is within the range of 0 and 40.

In one embodiment, upon determining that the randomly selected first award number 152 is within the subset of numbers 126 and responsively providing the corresponding bonus award 76 to the player, the system controller 16 may generate a modified subset of numbers, randomly select another award number, and provide another award to the player if the randomly selected award number is within the modified subset of numbers. For example, in one embodiment, the system controller 16 may receive a wager indicative of 50 credits and assign a subset of numbers between the range of 0 and 50. The system controller 16 may also randomly select an award number equal to 20, and responsively provide the award to the player because the selected award number, 20, is within the subset of numbers, 0 to 50. Upon providing the award, the system controller 16 generates a modified subset of numbers as a function of the randomly selected award number and the current subset of numbers. For example, assuming the selected award number is equal to 20, the system controller 16 determines the top range number of the modified subset of numbers being equal to the top range of the previous subset of numbers, i.e. 50 less the selected award number, i.e. 20, and determines the modified subset of numbers to includes a range between 0 and 28 (e.g. 50−20−1=top range of modified subset). The system controller 16 randomly selects another award number and provides another award to the player is the selected award number falls within the modified subset of numbers. In addition, if the award number falls within the modified subset of numbers, the system controller 16 determines another modified subset of numbers and selects another award number for use in providing a third award to the player.

In one embodiment, the system controller 16 may provide the award to the player as a function of the determined wager number 128. Moreover, the system controller 16 may provide the award to the player if the first award number 152 matches the wager number 128. In addition, the system controller 16 may provide the award to the player if the first award number 152 is less than or greater than the wager number 128. For example, upon receiving a wager equal to 40 credits, the system controller 16 may select the wager number 128 being equal to 40, and provide the bonus award 76 to the player if the randomly first award number 152 is less than or equal to 40.

In method step 214, the system controller 16 determines a second range of award numbers, e.g. a modified range of award numbers 154 for use in a subsequent determination of the bonus award feature 72. Moreover, the system controller 16 determines the modified range of award numbers 154 as a function of the previously received wager. In one embodiment, the system controller 16 generates the modified range of award numbers 154 by reducing the first range of award numbers 150 by an amount indicative of the previously received wager such that the amount of numbers within the modified range of award numbers 154 is less than the amount of numbers included in the first range of award numbers 150. For example, in one embodiment, the system controller 16 may subtract the wager number 128 associated with the first wager from the first range of award numbers 150 to generate the modified range of award numbers 154.

Referring to FIG. 8, in one embodiment, the system controller 16 modifies a maximum range value of the first range of award numbers 150 to determine the second range of award numbers 154. Moreover, the system controller 16 may reduce the maximum range value by an amount of numbers equal to the wager number 128 and/or the total value of previously received wagers. For example, in one embodiment, the system controller 16 may determine the second range of award numbers 154 using the following equation:

$$R_{max}=R\max_{prev}-W_{prev} \quad \text{Equation (1)}$$

where: $R$=current maximum award range value $R\max_{prev}$=previous maximum award range value $W_{prev}$=previous wager value The award unit 110 determines the second range of award numbers 154 having a current maximum award range value, $R_{max}$, as a function of the previous maximum award range value, $Rmax_{prev}$, being associated with the first range of award numbers 150, and the previous wager value, $W_{prev}$. In one embodiment, the previous wager value, $W_{prev}$, may be equal to the determined wager value 128 associated with the first wager. In addition, the award unit 110 may determine the previous wager value, $W_{prev}$, to be equal to the sum of each wager value being associated with each wager received since a previous bonus award 76 was provided to a player. For example, as shown in FIG. 8, in one embodiment, the award unit 110 may determine the first range of award numbers 150 including a range of numbers between 0 an 20,000, with the previous maximum award range value, $Rmax_{prev}$, being equal to 20,000. The award unit 110 may also receive a first wager having an associated wager number 128 being equal to 40 and determine the previous wager value, $W_{prev}$, being equal to 40. Using equation (1), the award unit 110 may determine the current maximum award range value, $R_{max}$, of the second range of award numbers 154 being equal to 19,960 (i.e. $R_{max}$=20,000−40=19,960), and the second range of award numbers 154 including a range of numbers between 0 and 19,960. By reducing the amount of numbers being included in the range of award numbers based on each previous wager, the probability of achieving the corresponding award is increased, thus increasing the probability of achieving the award with each subsequent wager.

Referring to FIG. 9, in another embodiment, the system controller 16 modifies a minimum range value of the first range of award numbers 150 to determine the second range of award numbers 154. Moreover, the system controller 16 may increase the minimum range value by an amount of numbers equal to the wager number 128 and/or a total value of the previously received wagers. For example, in one embodiment, the system controller 16 may determine the second range of award numbers 154 using the following equation:

$$R_{min}=R\min_{prev}-W_{prev} \quad \text{Equation (2)}$$

where: $R_{min}$=current minimum award range value $R\min_{prev}$=previous minimum award range value $W_{prev}$=previous wager value The award unit 110 determines the second range of award numbers 154 having a current minimum award range value, $R_{min}$, as a function of the previous minimum award range value, $Rmin_{prev}$, being associated with the first range of award numbers 150 and the previous wager value, $W_{prev}$. For example, as shown in FIG. 9, in one embodiment, the award unit 110 may determine the first range of award numbers 150 including a range of numbers between 0 an 20,000, with the previous minimum award range value, $Rmin_{prev}$, being equal to 0. The award unit 110 may also receive a first wager having an associated wager number 128 being equal to 40 and determine the previous wager value, $W_{prev}$, being equal to 40. Using equation (2), the award unit 110 may determine the current minimum award range value, $R_{min}$, of the second range of award numbers 154 being equal to 40 (i.e. $R_{min}$=0+40=40), and the second range of award numbers 154 including a range of numbers between 40 and 20,000.

In method step 216, the system controller 16 receives a second wager from one or more gaming devices 12 and initiates the bonus award feature 72 including the modified range of award numbers 154.

In method step 218, the system controller 16 determines an amount of numbers being included in a second subset of numbers 156 as function of a value of the received second wager and selects the second subset of numbers 156 from the modified range of award numbers 154. The second subset of numbers 156 may include a consecutive range of numbers, a set of randomly selected numbers, and/or groups of consecutive numbers. In one embodiment, the system controller 16 may determine a second wager number 158 within the second range of award numbers 154 as a function of the value of the second wager. In addition, the system controller 16 may also determine the second subset of numbers 156 as a function of the second wager number 158.

In method step 220, the system controller 16 randomly selects a second award number 160 from the modified range of award numbers 154 and associates the second award number 160 with the bonus award 76.

In method step 222, the system controller 16 determines if the second award number 160 is within the second subset of numbers 156 and responsively provides the corresponding bonus award 76 if the second award number 160 is within the second subset of numbers 156. For example, as shown in FIG. 8, in one embodiment, the system controller 16 may receive a second wager having a wager value being equal to 25, determine the second wager number 158 being equal to 25, and determine the second subset of numbers 156 including a range of numbers between 0 and 25. The system controller 16 may also randomly select the second award number 160 from the modified range of award numbers 154, e.g. a range between 0 and 19,960, and provide the bonus award 76 if the second award number 160 is within the range of numbers included in the second subset of numbers 156, e.g. between 0 and 25. In one embodiment, the system controller 16 may provide the award to the player if the second award number 160 matches the second wager number 158 and/or if the second award number 160 is less than or greater than the second wager number 158.

In one embodiment, upon determining the second award number 160 is not within the second subset of numbers 156, the system controller 16 may determine another modified range of award numbers, e.g. a third range of award numbers 162 for use in a subsequent bonus award feature 72. In one embodiment, the system controller 16 may determine the third range of award numbers 162 as a function of the first wager and the second wager. For example, as shown in FIG. 8, in one embodiment, the system controller 16 may determine the third range of award numbers 162 using equation (1). The system controller 16 determines the previous maximum award range value, $Rmax_{prev}$ being associated with the second range of award numbers 154, e.g. 19,960, and the previous wager value, $W_{prev}$ being associated with the second wager, e.g. 25. Using equation (1), the system controller 16 may determine the current maximum award range value, $R_{max}$, of the third range of award numbers 162 being equal to 19,935 (i.e. $R_{max}$=19,960−25=19,935), and the third range of award numbers 162 including a range of numbers between 0 and 19,935. In addition, the system controller 16 may also receive a third wager from one or more gaming devices 12 and determine a third subset of numbers 164 as a function of the third wager, select a third award number 166 from the third range of award numbers 162, and provide the bonus award 76 to the player if the third award number 166 is within the third subset of numbers 164.

In another embodiment, the system controller 16 may determine the modified range of award numbers 154 as a function of a predefined range of numbers and a total value of previous wagers received. Moreover, the system controller 16 may reduce a maximum range value of the predefined range of numbers by an amount of numbers equal to the total value of previous wagers. For example, in one embodiment, the system controller 16 may determine a modified range of award numbers 154 using the following equation:

$$R_{max}=R\max_{pred}-W_{cum} \quad \text{Equation (3)}$$

where: $R_{max}$=current maximum award range value $R\max_{pred}$=predefined maximum award range value $W_{cum}$=cumulative total wager value of previous wagers Using equation (3), the system controller 16 determines the modified range of award numbers 154 having a current maximum award range value, $R_{max}$, as a function of a predefined maximum award range value, $R\max_{pred}$ and a cumulative total wager value of previous wagers, $W_{cum}$. Moreover, the system controller 16 may determine the cumulative total wager value of previous wagers, $W_{cum}$, being equal to the sum of wager values being received since the last award was provided by the system controller 16. For example, as shown in FIG. 8, in one embodiment, the system controller 16 may determine a predefined range of numbers having a maximum award range value, $R\max_{pred}$, being equal to 20,000. The system controller 16 may also determine the cumulative total wager value of previous wagers, $W_{cum}$, being equal to the sum of the values of the first and second wagers, e.g. $W_{cum}$=25+40=65. Using equation (3), the system controller 16 may determine the current maximum award range value, $R_{max}$, of the modified range of award numbers 154 being equal to 19,935 (i.e. $R_{max}$=20,000−65=19,935), and the modified range of award numbers 154 including a range of numbers between 0 and 19,935. In one embodiment, as shown in FIG. 9, the system controller 16 may determine the modified range of award numbers 154 by increasing a predefined minimum range value by the cumulative total wager value of previous wagers, $W_{cum}$.

FIG. 10 is a schematic view of another gaming device 170 for providing an award to a player, according to an embodiment of the invention. In the illustrated embodiment, the gaming device 170 may be a smartphone, a personal computer, laptop, cell phone, tablet computer, smartphone/tablet computer hybrid, personal data assistant, and/or any suitable computing device that displays graphical interfaces that enable the user to play the game 68 and to initiate the bonus award feature 72. In the illustrated embodiment, the gaming device 170 includes a display device 172 such as, for example, the display device 26, a user input device 174 such as, for example, user input device 28, and the gaming controller 14 coupled to the display device 172 and the user input device 174.

The gaming controller 14 includes the processor 78 and the memory device 94 that is coupled to the processor 78. The memory device 94 stores programs and information used by the processor 78 including, but not limited to, image data for producing images and/or screens on the display device 172, game indicia, symbol weights, paytables, and/or winning combination tables which represent relationships between combinations of random numbers, combinations of symbol matches and types of awards associated with the game 68 and the bonus award feature 72.

The processor 78 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the gaming controller 14 to store, retrieve, and/or execute instructions and/or data. The gaming controller 14 in particular executes the game program and the bonus award feature program to implement the method 200 and thereby conducts the game 68 and the bonus award feature 72 in accordance with the embodiments described herein.

The above-described system, apparatus, and methods overcome at least some disadvantages of known gaming systems by providing a gaming system that provides a bonus award feature that increases a probability of winning an award based on an amount of previous wager received. Moreover, the gaming system determines the total value of previously received wagers, determines a range of award numbers as a function of the previous wagers, and randomly selects an award number from the determined range of award numbers. In addition, the gaming system selects a subset of numbers from the range of award numbers based on the received wager, and provides the progressive award to the corresponding player if the randomly selected award number is within the subset of numbers associated with the received wager. By selecting a subset of the range of award numbers based on the received wager, each wager being placed by the player is associated with a probability of receiving the progressive award. In addition, by reducing the range of award numbers based on each previous wager, the probability of receiving the progressive award increases with each wager being received. Thus, the amount of time that the gaming devices are played by patrons of a gaming establishment is thereby increased.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A system for providing an award to a player, comprising:

a plurality of gaming devices, each gaming device for receiving a wager from a player and responsively displaying a game; and a controller coupled to each of the plurality of gaming devices, the controller configured to:

receive a signal indicative of a first wager being received by at least one of the gaming devices;

determine a current range of award numbers as a function of at least one previous wager;

randomly select a first award number from the current range of award numbers;

determine a first subset of numbers within the current range of award numbers as a function of the received first wager;

determine if the first award number is within the determined first subset of numbers;

responsively provide an award to the player being associated with the at least one gaming device upon determining the first award number is within the determined first subset of numbers;

determine a modified range of award numbers upon determining the first award number is not within the determined first subset of numbers, the modified range of award numbers being determined by subtracting an amount of the received first wager from the current range of award numbers, the modified range of award numbers being used with a subsequent game;

receive a signal indicative of a second wager being received by one of the gaming devices;

randomly select a second award number from the modified range of award numbers;

determine a second subset of numbers within the modified range of numbers, the second subset of numbers being determined as a function of the second wager; and provide the award to a player associated with the second wager upon determining the second award number is within the second subset of numbers.

2. The system in accordance with claim 1, the controller configured to:

determine the current range of award numbers having a first maximum range value and determine the modified range of award numbers having a second maximum range value that is different from the first maximum range value.

3. The system in accordance with claim 1, the controller configured to:

determine a wager number within the current range of award numbers as a function of the received first wager; and provide the award to the player as a function of the determined wager number.

4. The system in accordance with claim 3, the controller configured to provide the award to the player if the selected award number matches the wager number.

5. The system in accordance with claim 3, the controller configured to provide the award to the player if the selected award number is less than the wager number.

6. The system in accordance with claim 1, the controller configured to determine one of a maximum range value and a minimum range value of the current range of award numbers as a function of the at least one previous wager.

7. A system for providing an award to a player, comprising:

a plurality of gaming devices, each gaming device for receiving a wager from a player and responsively displaying a game: and a controller coupled to each of the plurality of gaming devices, the controller configured to:

receive a signal indicative of a first wager being received by at least one of the gaming devices:

determine a current range of award numbers by subtracting the amount of at least one previous wager from a predefined range of award numbers;

randomly select a first award number from the current range of award numbers;

determine a first subset of numbers within the current range of award numbers as a function of the received first wager;

determine if the first award number is within the determined first subset of numbers;

responsively provide an award to the player being associated with the at least one gaming device upon determining the first award number is within the determined first subset of numbers;

determine a modified range of award numbers upon determining the first award number is not within the determined first subset of numbers, the modified range of award numbers being determined as a function of the current range of award numbers and the received first wager, the modified range of award numbers being used with a subsequent game;

receive a signal indicative of a second wager being received by one of the gaming devices;

randomly select a second award number from the modified range of award numbers;

determine a second subset of numbers within the modified range of numbers, the second subset of numbers being determined as a function of the second wager; and provide the award to a player associated with the second wager upon determining the second award number is within the second subset of numbers.

8. The system in accordance with claim 7, the controller configured to determine a second modified range of award numbers upon determining the second award number is not within the determined second subset of numbers, the second modified range of award numbers being used with another subsequent game.

9. A gaming device for providing an award to a player, comprising:

a display device for displaying a game to a player, the game including a plurality of reels being displayed in a grid; and a controller coupled to the display device, the controller configured to:

receive a signal indicative of a first wager being received from a player;

determine a current range of award numbers as a function of at least one previous wager;

randomly select a first award number from the current range of award numbers;

determine a first subset of numbers within the current range of award numbers as a function of the received wager;

determine if the first award number is within the determined first subset of numbers;

responsively provide an award to the player upon determine the first award number is within the determined first subset of numbers;

determine a modified range of award numbers upon determining the first award number is not within the determined first subset of numbers, the modified range of award numbers being determined by subtracting an amount of the received first wager from the current range of award numbers, the modified range of award numbers being used with a subsequent game;

receive a signal indicative of a second wager being received by the gaming device;

randomly select a second award number from the modified range of award numbers;

determine a second subset of numbers within the modified range of numbers, the second subset of numbers being determined as a function of the second wager; and provide the award to a player associated with the second wager upon determining the second award number is within the second subset of numbers.

10. The gaming device in accordance with claim 9, the controller configured to:

determine the current range of award numbers having a first maximum range value and determine the modified range of award numbers having a second maximum range value that is different from the first maximum range value.

11. The gaming device in accordance with claim 9, the controller configured to:

determine a wager number within the current range of award numbers as a function of the received first wager; and provide the award to the player as a function of the determined wager number.

12. The gaming device in accordance with claim 11, the controller configured to provide the award to the player if the selected award number matches the wager number.

13. The gaming device in accordance with claim 11, the controller configured to provide the award to the player if the selected award number is less than the wager number.

14. The gaming device in accordance with claim 9, the controller configured to determine one of a maximum range value and a minimum range value of the current range of award numbers as a function of the at least one previous wager.

15. The gaming device in accordance with claim 9, the controller configured to determine the current range of award numbers by subtracting the amount of the at least one previous wager from a predefined range of award numbers.

16. A method of providing an award to a player via a system including a controller coupled to a plurality of gaming devices, including the steps of:

receiving a signal indicative of a first wager being received by at least one of the plurality of gaming devices;

determining a current range of award numbers as a function of at least one previous wager;

randomly selecting a first award number from the current range of award numbers;

determining a first subset of numbers within the current range of award numbers as a function of the received first wager;

determining if the first award number is within the determined first subset of numbers;

responsively providing an award to a player being associated with the at least one gaming device upon determining the selected first award number is within the determined subset of numbers;

determining a modified range of award numbers upon determining the first award number is not within the determined first subset of numbers, the modified range of award numbers being determined by subtracting an amount of the received first wager from the current range of award numbers, the modified range of award numbers being used with a subsequent game receiving a signal indicative of a second wager being received by one of the gaming devices;

randomly selecting a second award number from the modified range of award numbers;

determining a second subset of numbers within the modified range of numbers, the second subset of numbers being determined as a function of the second wager; and providing the award to a player associated with the second wager upon determining the second award number is within the second subset of numbers.

17. The method in accordance with claim 16, including the steps of:

determining the current range of award numbers having a first maximum range value and determining the modified range of award numbers having a second maximum range value that is different from the first maximum range value.

18. The method in accordance with claim 16, including the steps of:

determining a wager number within the current range of award numbers as a function of the received first wager; and providing the award to the player as a function of the determined wager number.

19. The method in accordance with claim 16, including the step of determining one of a maximum range value and a minimum range value of the current range of award numbers as a function of the at least one previous wager.

20. The method in accordance with claim 16, including the steps of: determining the current range of award numbers by subtracting the amount of the at least one previous wager from a predefined range of award numbers.

* * * * *